(12) United States Patent
Saito

(10) Patent No.: US 11,981,272 B2
(45) Date of Patent: May 14, 2024

(54) EXTERIOR MEMBER AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Yasuyuki Saito, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 310 days.

(21) Appl. No.: 17/436,899

(22) PCT Filed: Jan. 20, 2020

(86) PCT No.: PCT/JP2020/001626
§ 371 (c)(1),
(2) Date: Sep. 7, 2021

(87) PCT Pub. No.: WO2020/179245
PCT Pub. Date: Sep. 10, 2020

(65) Prior Publication Data
US 2022/0161742 A1 May 26, 2022

(30) Foreign Application Priority Data

Mar. 7, 2019 (JP) .................................. 2019-041801

(51) Int. Cl.
*B60R 16/02* (2006.01)
*H01B 7/18* (2006.01)
(Continued)

(52) U.S. Cl.
CPC ........... *B60R 16/0215* (2013.01); *H01B 7/18* (2013.01); *H01B 7/42* (2013.01); *H02G 3/04* (2013.01)

(58) Field of Classification Search
CPC ........ H01B 7/18; H01B 7/42; B60R 16/0215; H02G 3/04
See application file for complete search history.

(56) References Cited

U.S. PATENT DOCUMENTS 6,020,867 A * 2/2000 Shimada ............... G09G 3/3611
345/905
9,077,835 B2 * 7/2015 Ozawa ............... H04N 1/00559
(Continued)

FOREIGN PATENT DOCUMENTS

JP   S61-197610 U   12/1986
JP   S62-104087 U    7/1987
(Continued)

OTHER PUBLICATIONS

Apr. 14, 2020 International Search Report issued in International Patent Application No. PCT/JP2020/001626.

*Primary Examiner* — Rockshana D Chowdhury
*Assistant Examiner* — Douglas R Burtner
(74) *Attorney, Agent, or Firm* — Oliff PLC

(57) ABSTRACT

An exterior member that includes a housing in which a cable is to be housed; a first projection that is formed on an inner peripheral surface of the housing and that is formed so as to protrude toward an inside of the housing from the inner peripheral surface of the housing; and a first radiation film that covers a surface of the first projection and that has a higher emissivity than the surface of the first projection.

9 Claims, 8 Drawing Sheets

(51) Int. Cl.
   *H01B 7/42*   (2006.01)
   *H02G 3/04*   (2006.01)

(56) References Cited

U.S. PATENT DOCUMENTS

| | | | | |
|---|---|---|---|---|
| 9,104,064 | B2* | 8/2015 | Takeuchi | G02F 1/133608 |
| 9,194,570 | B2* | 11/2015 | Wakamiya | F21V 23/02 |
| 9,507,193 | B2* | 11/2016 | Ozeki | G02B 6/0088 |
| 9,762,040 | B2* | 9/2017 | Ogawa | B60R 16/0215 |
| 9,766,488 | B2* | 9/2017 | Nishi | G02F 1/133308 |
| 10,018,868 | B2* | 7/2018 | Masuda | G02F 1/133615 |
| 10,618,477 | B2* | 4/2020 | Hagi | H01B 7/18 |
| 10,867,721 | B2 | 12/2020 | Ishida et al. | |
| 2007/0018581 | A1* | 1/2007 | Domae | H01J 61/35 |
| | | | | 313/635 |
| 2008/0117599 | A1* | 5/2008 | Endo | H05K 7/20427 |
| | | | | 361/705 |
| 2011/0176064 | A1* | 7/2011 | Kasai | G02B 6/0091 |
| | | | | 348/E5.133 |
| 2012/0170248 | A1* | 7/2012 | Masuko | F21K 9/00 |
| | | | | 362/95 |
| 2014/0085862 | A1* | 3/2014 | Higuchi | F21V 13/14 |
| | | | | 362/310 |
| 2014/0116189 | A1* | 5/2014 | Nono | F16C 1/108 |
| | | | | 74/502.4 |
| 2015/0109792 | A1* | 4/2015 | Ishida | F21K 9/60 |
| | | | | 362/294 |
| 2015/0294765 | A1* | 10/2015 | Katsumata | B32B 15/04 |
| | | | | 138/139 |
| 2016/0322797 | A1* | 11/2016 | Kimoto | H02G 3/04 |
| 2017/0207613 | A1* | 7/2017 | Nakai | H02G 3/0481 |
| 2017/0246998 | A1* | 8/2017 | Ogue | H01R 31/02 |
| 2017/0256336 | A1* | 9/2017 | Takiguchi | B60R 16/0215 |
| 2017/0349122 | A1* | 12/2017 | Yanazawa | B60R 16/0215 |
| 2018/0118138 | A1* | 5/2018 | Tsukamoto | H01R 4/34 |
| 2018/0134237 | A1* | 5/2018 | Araki | H02G 15/1806 |
| 2018/0145430 | A1* | 5/2018 | Yanai | H01R 4/70 |
| 2018/0174709 | A1* | 6/2018 | Hagi | B60L 15/00 |
| 2018/0233893 | A1* | 8/2018 | Adachi | H01B 7/18 |
| 2019/0392963 | A1* | 12/2019 | Ishida | H01B 7/0045 |
| 2020/0116994 | A1* | 4/2020 | Gu | G03B 17/55 |
| 2021/0094071 | A1* | 4/2021 | Yamada | G01S 7/521 |
| 2021/0122308 | A1* | 4/2021 | Fujikura | B60R 16/0222 |
| 2022/0131351 | A1* | 4/2022 | Shimizu | H01B 7/00 |
| 2022/0167533 | A1* | 5/2022 | Kinoshita | H05K 9/0007 |

FOREIGN PATENT DOCUMENTS

| | | |
|---|---|---|
| JP | H02-5824 U | 1/1990 |
| JP | H03-26220 U | 3/1991 |
| JP | H04-061413 U | 5/1992 |
| JP | 2003-17880 A | 1/2003 |
| JP | 2005-44607 A | 2/2005 |
| JP | 2018-37260 A | 3/2018 |
| JP | 2020167930 A * | 10/2020 |
| WO | 2018/155166 A1 | 8/2018 |

* cited by examiner

EXTERIOR MEMBER AND WIRE HARNESS

BACKGROUND

The present disclosure relates to an exterior member and a wire harness.

A conventional wire harness used in a vehicle such as a hybrid vehicle or an electric vehicle includes cables that electrically connect a high-voltage battery and an electric device such as an inverter (for example, see JP 2005-44607A and JP 2018-37260A). In this wire harness, a plurality of cables are covered by an exterior member such as a metal pipe or a resin pipe in order to protect the cables and as a countermeasure against noise.

SUMMARY

Incidentally, recent years has seen an increase in the magnitude of a current flowing through a cable passed through an exterior member, as well as an increase in the amount of heat generated by a cable. Thus, there is a demand for improvement of heat dissipation in a wire harness including an exterior member and a cable.

In view of this, an exemplary aspect of the disclosure provides an exterior member and a wire harness that can improve heat dissipation.

An exterior member according to an exemplary aspect includes a housing in which a cable is to be housed; a first projection that is formed on an inner peripheral surface of the housing and that is formed so as to protrude toward an inside of the housing from the inner peripheral surface of the housing; and a first radiation film that covers a surface of the first projection and that has a higher emissivity than the surface of the first projection.

The exterior member and the wire harness according to the present disclosure are effective in that heat dissipation can be improved.

DETAILED DESCRIPTION OF EMBODIMENTS

Figure 1:
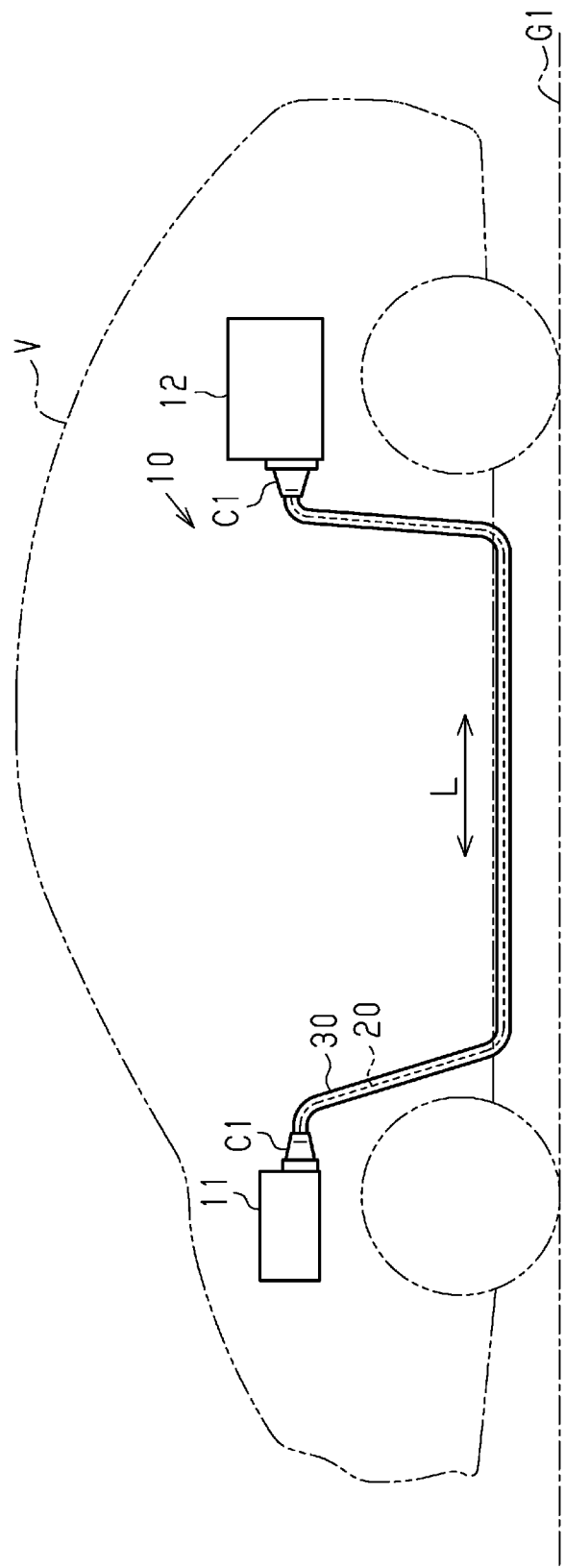
FIG. 1 is a schematic diagram illustrating a configuration of a wire harness according to one embodiment.

Specific examples of an exterior member and a wire harness according to the present disclosure will be described below with reference to the drawings. In the drawings, some configurations may be illustrated in an exaggerated or simplified fashion for convenience of description. Furthermore, the dimensional ratio between components may vary among drawings. Note that the present disclosure is not limited to these examples, and is intended to include all modifications that are indicated by the claims and are within the meaning and scope of equivalents of the claims.

A wire harness 10 illustrated in FIG. 1 electrically connects two or three or more electric devices (devices). For example, the wire harness 10 electrically connects an inverter 11 that is installed in a front part of a vehicle V such as a hybrid vehicle or an electric vehicle, and a high-voltage battery 12 that is installed in a rear portion of the vehicle V relative to the inverter 11. For example, the wire harness 10 is routed to run through the underfloor space, etc., of the vehicle V. The inverter 11 is connected to a motor (not illustrated) that is for driving vehicle wheels and that serves as the source of power for vehicle travel. The inverter 11 generates AC power from DC power received from the high-voltage battery 12, and supplies the AC power to the motor. For example, the high-voltage battery 12 is a battery that can supply a voltage of several hundred volts.

The wire harness 10 includes one cable 20 or a plurality of (two in this case) cables 20, a pair of connectors C1 attached to two ends of the cables 20, and an exterior member 30 that collectively surrounds the plurality of cables 20.

One end of each cable 20 is connected to the inverter 11 via the connector C1, and the other end of each cable 20 is connected to the high-voltage battery 12 via the connector C1. For example, each cable 20 is formed in an elongated shape so as to extend in the front-rear direction of the vehicle. For example, each cable 20 is a high-voltage cable that can withstand high voltages and large currents. For example, each cable 20 is an unshielded cable that does not have an electromagnetic shield structure.

Figure 2:
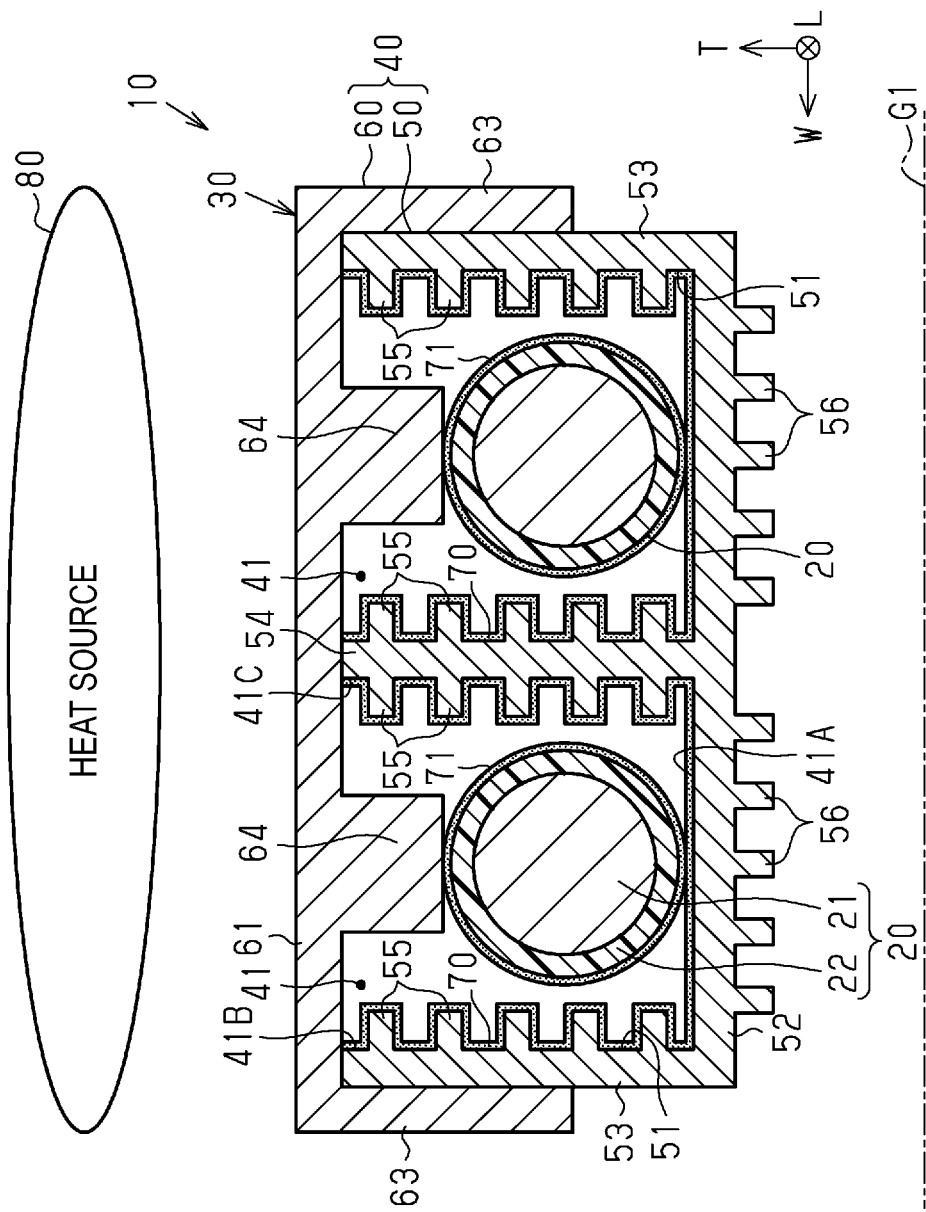
FIG. 2 is a schematic cross-sectional diagram illustrating the wire harness according to one embodiment.

As illustrated in FIG. 2, each cable 20 is a covered cable including a core wire 21 that is formed from a conductor, and an insulating cover 22 that covers the outer periphery of the core wire 21. In the following description, the direction in which the cables 20 extend is referred to as a lengthwise direction L, the direction in which the plurality of cables 20 are arranged side by side, among directions that are orthogonal to the lengthwise direction L, is referred to as a width direction W, and the direction that is orthogonal to both the lengthwise direction L and the width direction W is referred to as a height direction T.

As the core wire 21, a stranded wire that is obtained by twisting together a plurality of metal wires, a columnar conductor that is formed from one columnar metal bar having a solid structure, a tubular conductor having a hollow structure, or the like can be used, for example. Furthermore, a stranded wire, a columnar conductor, and a tubular conductor may be used in combination as the core wire 21. For example, examples of a columnar conductor include a single core wire, a bus bar, etc. For example, a metal material such as a copper-based or aluminum-based metal material can be used as the material of the core wire 21. For example, the core wire 21 is formed through extrusion molding.

The cross-sectional shape when the core wire 21 is cut along a plane that is orthogonal to the lengthwise direction L of the core wire 21 can be set to any shape. That is, the transverse-sectional shape of the core wire 21 can be set to any shape. For example, the core wire 21 is formed to have a circular, semi-circular, polygonal, square, or flat transverse-sectional shape. In the present specification, a flat shape may indicate a shape that has a short side/short axis and a long side/long axis and that has an aspect ratio that is not 1, and "flat shapes" include the shapes of a rectangle, an ellipse, an oval, etc., for example. Note that, in the present specification, a "rectangle" is a shape that has long sides and short sides, and does not include squares. Furthermore, in the present specification, a "rectangle" also includes shapes having chamfered corners and shapes having rounded corners. The core wire 21 according to the present embodiment is formed to have a circular transverse-sectional shape.

For example, the insulating cover 22 adheres to and covers the entire outer peripheral surface of the core wire 21. For example, the insulating cover 22 is made of an insulating material such as a synthetic resin. For example, the insulating cover 22 can be formed by being extrusion-molded (extrusion-coated) onto the core wire 21.

The exterior member 30 illustrated in FIG. 1 has the shape of an elongated tube that is long in the lengthwise direction L, for example. The plurality of cables 20 are passed through the internal space of the exterior member 30. For example, the exterior member 30 is formed so as to surround the entire outer periphery of the plurality of cables 20. For example, the exterior member 30 protects the cables 20 from flying objects and droplets of water. As the exterior member 30, a pipe made of metal or resin, a protector made of resin, a flexible corrugated tube made of resin or the like, or a waterproof cover made of rubber, or combinations of such materials can be used, for example. A metal material such as a copper-based, iron-based, or aluminum-based metal material can be used as the material of a metal pipe. For example, an electroconductive resin material or a non-electroconductive resin material can be used as the material of a corrugated tube or protector made of resin. For example, synthetic resins such as polyolefin, polyamide, polyester, and ABS resins can be used as a resin material.

Figure 3:
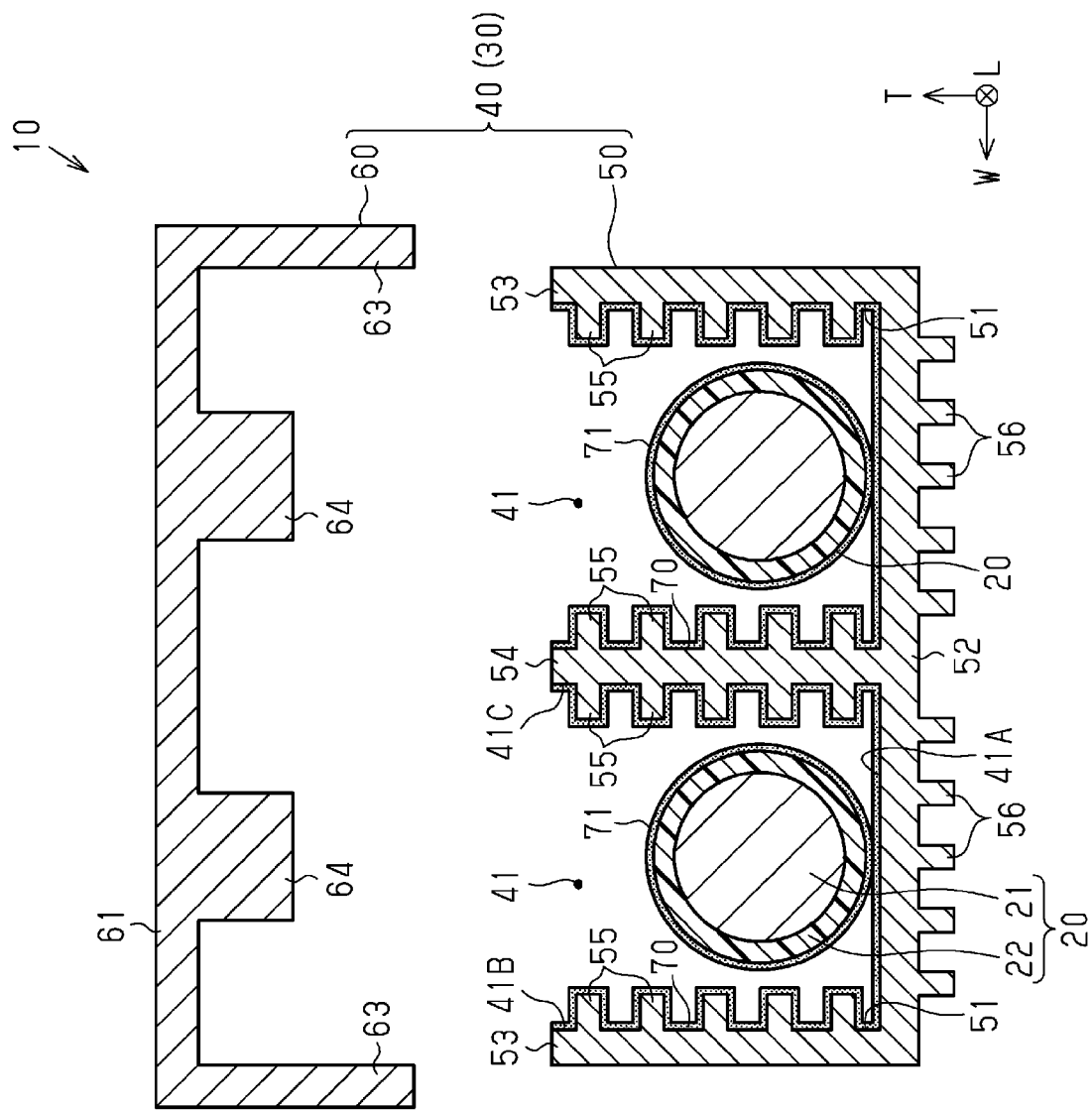
FIG. 3 is a schematic cross-sectional diagram illustrating the wire harness according to one embodiment.

As illustrated in FIGS. 2 and 3, the exterior member 30 includes a protective tube 40 made of metal. For example, the protective tube 40 has a plurality of (two in this case) tubular housing portions 41 (tubular housings) in each of which one of the plurality of (two in this case) cables 20 is individually housed. The housing portions 41 according to the present embodiment are formed in the shape of rectangular tubes.

The protective tube 40 includes a case 50 that includes a plurality of (two in this case) groove portions 51 (grooves) that are shaped into grooves, and a cover 60 that is attached to the case 50 and that covers the groove portions 51. The protective tube 40 is formed by the cover 60 being attached to the case 50 so as to cover the groove portions 51. Furthermore, the housing portions 41 are each constituted by a groove portion 51 and the cover 60 covering the groove portion 51. In the protective tube 40 according to the present embodiment, the case 50 and the cover 60 are formed as separate parts. The case 50 and the cover 60 are each formed through extrusion molding, for example. The case 50 and the cover 60 as described above are formed so as to have the same transverse-sectional shape over the entire length thereof in the lengthwise direction L, for example.

For example, a metal material such as an iron-based or aluminum-based metal material can be used as the material of the case 50 and the cover 60. The material of the case 50 and the material of the cover 60 may be the same as one another or may differ from one another. Besides a protection function for protecting the plurality of cables 20 from flying objects, etc., the protective tube 40 has an electromagnetic shield function for protecting the plurality of cables 20 from electromagnetic waves, and a heat dissipation function for dissipating heat generated by the cables 20, etc.

Next, the structure of the case 50 will be described.

The case 50 includes a bottom wall 52 that extends along the lengthwise direction L, a pair of side walls 53 that protrude in the height direction T from two ends of the bottom wall 52 in the width direction W, and a partition wall 54 that protrudes in the height direction T from the center part of the bottom wall 52 in the width direction W. For example, the case 50 is formed to have an E-shaped transverse-sectional shape. For example, the bottom wall 52 is formed in the shape of an elongated flat plate that is long in the lengthwise direction L. For example, the side walls 53 and the partition wall 54 are formed in the shape of an elongated flat plate that is long in the lengthwise direction L. For example, the side walls 53 and the partition wall 54 extend over the entire length of the bottom wall 52 in the lengthwise direction L. For example, the side walls 53 and the partition wall 54 are disposed standing on the upper surface of the bottom wall 52. For example, the side walls 53 and the partition wall 54 are formed so as to stand vertically from the upper surface of the bottom wall 52. For example, the length of the side walls 53 in the height direction T and the length of the partition wall 54 in the height direction T are set substantially the same. Note that the length of the partition wall 54 in the height direction T may be set smaller than the length of the side walls 53 in the height direction T.

In the case 50, each groove portion 51 is constituted by the bottom wall 52, one side wall 53, and the partition wall 54. Specifically, a groove portion 51 is the space surrounded by the upper surface of the bottom wall 52, and a side surface of a side wall 53 and a side surface of the partition wall 54 that face one another in the width direction W. For example, the groove portions 51 are formed so as to extend along the lengthwise direction L, and are formed so as to be open upward in the drawings. The two groove portions 51 are arranged side by side along the width direction W, and are partitioned from one another by the partition wall 54. In other words, the two groove portions 51 share one partition wall 54. In each of the groove portions 51, one of the cables 20 is individually housed. For example, the length of the groove portions 51 in the width direction W and the length of the groove portions 51 in the height direction T are set larger than the outer diameter of the cables 20, which have a circular transverse-sectional shape.

Note that, in the following description, the upper surface of the bottom wall 52 constituting a groove portion 51 is referred to as a bottom surface 41A of a housing portion 41, a side surface of a side wall 53 constituting a groove portion 51 is referred to as an inner side surface 41B of a housing portion 41, and a side surface of the partition wall 54 constituting a groove portion 51 is referred to as an inner side surface 41C of a housing portion 41.

A plurality of (five in this case) projections 55 protruding toward the inside of a housing portion 41 are formed on each of the inner side surfaces 41B and 41C, among the bottom surface 41A and the inner side surfaces 41B and 41C of the housing portion 41. The projections 55 are formed integrally with the inner side surfaces 41B and 41C so as to be continuous with the inner side surfaces 41B and 41C. For example, the plurality of projections 55 are disposed side by side along the height direction T. For example, the plurality of projections 55 are disposed with a predetermined space therebetween in the height direction T. For example, each projection 55 is formed so as to protrude along the width direction W. For example, the projections 55 formed on the inner side surface 41B and the projections 55 formed on the inner side surface 41C face one another. For example, each projection 55 is formed so as to extend along the lengthwise direction L. For example, each projection 55 extends over the entire length of the bottom wall 52 in the lengthwise direction L. The transverse-sectional shape of the projections 55 can be set to any shape. For example, the projections 55 can be formed to have a semi-circular, polygonal, or flat transverse-sectional shape. The projections 55 according to the present embodiment are formed to have a rectangular transverse-sectional shape.

Due to the projections 55 being formed, the inner side surfaces 41B and 41C of a housing portion 41 are formed in a shape having recesses and projections. On the other hand, the projections 55 are not formed on the bottom surfaces 41A of the housing portions 41. Thus, the bottom surfaces 41A of the housing portions 41 are formed to be flat surfaces.

As illustrated in FIG. 2, a plurality of projections 56 protruding outward (downward in this case) are formed on the lower surface of the bottom wall 52 of the outer peripheral surface of the protective tube 40. For example, the plurality of projections 56 are disposed side by side along the width direction W. For example, the plurality of projections 56 are disposed with a predetermined space therebetween in the width direction W. Each projection 56 is formed so as to protrude from the lower surface of the bottom wall 52 in a direction away from the housing portions 41. For example, each projection 56 is formed so as to protrude along the height direction T. In the present embodiment, the projections 56 are formed on a portion of the outer peripheral surface of the protective tube 40 that is farthest from a heat source 80; that is, on the lower surface of the bottom wall 52 in this case. In other words, in the protective tube 40, the projections 56 are formed on the lower surface of the bottom wall 52, which is a portion of the outer peripheral surface that is located on the opposite side from the heat source 80 with the housing portions 41 therebetween. For example, each projection 56 is formed so as to protrude in a direction away from the heat source 80. In the illustrated example, the projections 56 are formed so as to protrude toward the ground G1.

Here, examples of the heat source 80 include a vehicle exhaust manifold and the like, for example. Furthermore, examples of the heat source 80 also include a vehicle body made from a metal material that reflects heat, and the like, for example.

The case 50 according to the present embodiment is a single part obtained by integrally forming the bottom wall 52, the pair of side walls 53, the partition wall 54, the projections 55, and the projections 56.

On the inner peripheral surface of each groove portion 51, or that is, on the bottom surface 41A and the inner side surfaces 41B and 41C of each housing portion 41, a radiation film 70 that has a higher emissivity than the bottom surface 41A and the inner side surfaces 41B and 41C is formed. The radiation film 70 adheres to and covers the entire surface of the projections 55 formed on the inner side surfaces 41B and 41C. For example, the radiation film 70 adheres to and covers the entire bottom surface 41A, the entire inner side surface 41B, and the entire inner side surface 41C of each housing portion 41. For example, the radiation film 70 is formed so as to be uniformly thin. For example, the thickness of the radiation film 70 can be set to around 10-30 μm. For example, the radiation film 70 is formed in a black color or a color approximating black that has a higher emissivity than the bottom surface 41A and the inner side surfaces 41B and 41C of the housing portions 41. For example, the emissivity of the radiation film 70 can be set to 0.7 or higher.

Here, in many cases, the metal (for example, aluminum) forming the case 50 is generally favorable in terms of thermal conductivity but not favorable in terms of emissivity. For example, aluminum has an emissivity of 0.1 or lower. Accordingly, on the inner peripheral surface of each groove portion 51, the radiation film 70 having a higher emissivity than the inner peripheral surface is formed. Thus, thermal conduction through radiation can be increased compared to a case in which the radiation film 70 is not formed.

Here, according to the Wien's displacement law, the peak wavelength of light emitted from an object by thermal radiation is inversely proportional to the temperature of the object. Furthermore, it is known that there are materials for which the value of emissivity varies depending upon object temperature (wavelength of light) even if the same material is used. In the present embodiment, since the wire harness 10 is installed in a vehicle V (see FIG. 1), it is preferable that the radiation film 70 has a high emissivity at the peak wavelength in the range of high temperatures occurring in the operating environment of the vehicle.

For example, as the radiation film 70, a coating film formed through a coating process in which the inner peripheral surface of each groove portion 51 is coated with a coating material having a higher emissivity than the inner peripheral surface of the groove portion 51 can be used. Furthermore, as the radiation film 70, a plating film formed by performing a plating process on the inner peripheral surface of each groove portion 51 can also be used, for example.

In the present embodiment, the radiation film 70 is not formed on the outer peripheral surface of the case 50. That is, in the case 50 according to the present embodiment, there is a difference in emissivity between the inner peripheral surface of each groove portion 51 (specifically, the radiation film 70 formed on the inner peripheral surface of each groove portion 51) and the outer peripheral surface of the case 50.

In the wire harness 10 according to the present embodiment, a radiation film 71 similar to the radiation film 70 is formed on the outer peripheral surface of each cable 20. The radiation film 71 is formed so as to cover the outer peripheral surface of the insulating cover 22 of each cable 20. For example, the radiation film 71 adheres to and covers the outer peripheral surface of the insulating cover 22. The radiation film 71 adheres to and covers the entire outer peripheral surface of the insulating cover 22 in the peripheral direction. For example, the radiation film 71 adheres to and covers the outer peripheral surface of the insulating cover 22 over substantially the entire length thereof in the lengthwise direction L. The emissivity of the radiation film 71 is set higher than the emissivity of the outer peripheral surface of the insulating cover 22. For example, the radiation film 71 is formed in a black color or a color approximating black that has a higher emissivity than the outer peripheral surface of the insulating cover 22. For example, the emissivity of the radiation film 71 can be set to 0.7 or higher.

Next, the structure of the cover 60 will be described.

The cover 60 includes an opposing wall 61 that extends along the lengthwise direction L and opposes the bottom wall 52 of the case 50, a pair of side walls 63 that protrude from two ends of the opposing wall 61 in the width direction W, and a plurality of pressing portions 64 that protrude from the lower surface of the opposing wall 61 in the height direction T between the pair of side walls 63. For example, the cover 60 is formed to have a comb-like transverse-sectional shape. The cover 60 according to the present embodiment is a single part obtained by integrally forming the opposing wall 61, the pair of side walls 63, and the pressing portions 64.

For example, the opposing wall 61 is formed in the shape of an elongated flat plate that is long in the lengthwise direction L. For example, the opposing wall 61 is formed so as to collectively close the upper openings of the plurality of groove portions 51. As illustrated in FIG. 2, the housing portions 41 are constituted by the groove portions 51 and the opposing wall 61 when the upper openings of the groove portions 51 are closed by the opposing wall 61. Thus, the lower surface of the opposing wall 61 constitutes a portion of the inner peripheral surface of each housing portion 41.

For example, the side walls 63 are each formed in the shape of an elongated flat plate that is long in the lengthwise direction L. For example, the side walls 63 extend over the entire length of the opposing wall 61 in the lengthwise direction L. For example, the side walls 63 are disposed standing on the lower surface of the opposing wall 61. For example, the side walls 63 are formed so as to stand vertically from the lower surface of the opposing wall 61. For example, the length of the side walls 63 in the height direction T is set smaller than the length of the side walls 53 of the case 50 in the height direction T.

The pressing portions 64 are formed so as to correspond to the groove portions 51 of the case 50. That is, the pressing portions 64 are disposed between the side walls 53 and the partition wall 54. The pressing portions 64 are formed so as to protrude from the lower surface of the opposing wall 61 toward the bottom wall 52 of the case 50. For example, the pressing portions 64 are disposed standing on the lower surface of the opposing wall 61. For example, the pressing portions 64 are formed so as to stand vertically from the lower surface of the opposing wall 61. For example, the length of the pressing portions 64 in the height direction T is set smaller than the length of the side walls 63 in the height direction T. For example, the pressing portions 64 are formed in the shape of an elongated column that is long in the lengthwise direction L. For example, the pressing portions 64 extend over the entire length of the opposing wall 61 in the lengthwise direction L. The transverse-sectional shape of the pressing portions 64 can be set to any shape. For example, the pressing portions 64 can be formed to have a semi-circular, polygonal, or flat transverse-sectional shape. The pressing portions 64 according to the present embodiment are formed to have a rectangular transverse-sectional shape. That is, the pressing portions 64 according to the present embodiment are formed in the shape of a quadrangular prism.

In the present embodiment, the projections 55 are not formed on the lower surface of the opposing wall 61. Furthermore, the radiation film 70 is not formed on the lower surface of the opposing wall 61 or the surface of each pressing portion 64. Thus, in the inner peripheral surface of each housing portion 41, there is a difference in emissivity between the inner peripheral surface of the groove portion 51 (specifically, the radiation film 70 formed on the inner peripheral surface of the groove portion 51) and the lower surface of the opposing wall 61. Thus, directivity can be imparted to thermal conduction through radiation.

In the protective tube 40, the upper openings of the two groove portions 51 are collectively closed by the opposing wall 61 of the cover 60 when the cover 60 is attached to the case 50. Thus, a housing portion 41 is constituted by a groove portion 51 and the opposing wall 61, and the entire outer periphery of each cable 20 is surrounded by the corresponding housing portion 41. In this state, the pressing portions 64 press the cables 20 housed in the housing portions 41 toward the bottom wall 52. The cable 20 pressed by each pressing portion 64 is in contact with the bottom surface 41A of a housing portion 41. Specifically, the radiation film 71 covering the outer periphery of the cable 20 is in contact with the radiation film 70 covering the bottom surface 41A of the housing portion 41. Furthermore, when the cover 60 is attached to the case 50, the upper surfaces of the side walls 53 of the case 50 and the upper surface of the partition wall 54 of the case 50 are in contact with the lower surface of the opposing wall 61. When the cover 60 is attached to the case 50, the side walls 63 of the cover 60 cover the side walls 53 of the case 50 from the outer side in the width direction W. In this state, the side walls 63 are in contact with the outer side surfaces of the side walls 53 of the case 50, for example.

For example, examples of the means for fixing the cover 60 to the case 50 include the means of sandwiching the case 50 and the cover 60 from above and below using a sandwiching member or the like, the means of winding a binding member or the like around the outer periphery of the case 50 and the cover 60, the means of integrating the case 50 and the cover 60 through welding or the like, etc.

Next, the effects of the present embodiment will be described.

(1) The protective tube 40 includes the projections 55, which are formed on the inner peripheral surface of each housing portion 41 and which are formed so as to protrude from the inner peripheral surface of the housing portion 41 toward the inside of the housing portion 41, and the radiation film 70, which covers the surface of each projection 55 and which has a higher emissivity than the surface of the projection 55.

According to this configuration, even if the emissivity of the inner peripheral surface of each housing portion 41 is low, the surface of each projection 55, which is a portion of the inner peripheral surface of the housing portion 41, is covered by the radiation film 70 having a high emissivity. Thus, thermal conduction through radiation can be increased compared to a case in which the radiation film 70 is not formed. Also, since the projections 55 are formed on the inner peripheral surface of each housing portion 41, the surface area of the inner peripheral surface of the housing portion 41 can be increased. Furthermore, the surface of each projection 55 is covered by the radiation film 70. Thus, thermal conduction through radiation can be increased. Accordingly, even if the inner peripheral surface of a housing portion 41 and the outer peripheral surface of a cable 20 are physically separated from one another, heat can be efficiently transmitted by radiation from the outer peripheral surface of the cable 20 to the housing portion 41, or that is, to the protective tube 40, and heat dissipation in the wire harness 10 can be improved. Consequently, an increase in temperature of the cables 20 can be kept low, and thus the size of the core wire 21 of the cables 20 can be reduced or the thickness of the insulating cover 22 of the cables 20 can be reduced.

(2) Only a portion of the outer peripheral surface of the protective tube 40 that is located on the opposite side from the heat source 80 with the housing portions 41 therebetween (the lower surface of the bottom wall 52 in this case) is provided with the projections 56 protruding outward from the outer peripheral surface. According to this configuration, the projections 56 are formed locally on a portion of the outer peripheral surface of the protective tube 40 rather than being formed on the entire outer peripheral surface of the protective tube 40. Thus, the surface area of the outer peripheral surface of the protective tube 40 at the portion where the projections 56 are formed is greater compared to the surface area of the outer peripheral surface at other portions. Accordingly, heat transmitted from the cables 20, etc., can be efficiently dissipated to the atmosphere from the projections 56. By locally disposing the projections 56 on a portion of the outer peripheral surface of the protective tube 40 in such a manner, directivity can be imparted to the thermal conduction through radiation. Here, since the projections 56 are disposed on the opposite side from the heat source 80, heat transmitted from the cables 20, etc., can be dissipated efficiently to the atmosphere at a distance from the heat source 80. For example, if the heat source 80 is a vehicle body, a problematic situation in which heat builds up in the space between the body and the protective tube 40 due to the heat radiated from the outer peripheral surface of the protective tube 40 being reflected by the metal surface of the body may occur. In contrast, the protective tube 40 according to the present embodiment can favorably suppress the build-up of heat in the space between the protective tube 40 and the heat source 80 since heat can be dissipated efficiently to the atmosphere on the opposite side from the body, which is the heat source 80.

(3) The protective tube 40 is constituted by the case 50 having the groove portions 51, and the cover 60, which is attached to the case 50 and covers the groove portions 51. Furthermore, the housing portions 41 are constituted by the cover 60 and the groove portions 51 of the case 50. The projections 55 are formed only on the inner side surfaces 41B and 41C of the inner peripheral surface of each housing portion 41, which are disposed between the bottom wall 52 of the case 50 and the opposing wall 61 of the cover 60. According to this configuration, the upper surface of the bottom wall 52 constituting the bottom surfaces 41A of the housing portions 41 can be formed to be a flat surface. Thus, in a case in which a cable 20 is pressed by the cover 60 for example, the cable 20 can be favorably brought in contact with the upper surface of the bottom wall 52. In this case, heat generated by the cables 20 can be efficiently conducted to the protective tube 40, and heat dissipation in the wire harness 10 can be further improved.

(4) The pressing portions 64 pressing the cables 20 toward the bottom wall 52 of the case 50 are formed on the lower surface of the opposing wall 61 of the cover 60. According to this configuration, the cables 20 housed in the housing portions 41 are pressed toward the bottom wall 52 by the pressing portions 64. Thus, the outer peripheral surface of each cable 20 can be brought in contact with the upper surface of the bottom wall 52, or that is, the bottom surface 41A of a housing portion 41, and the degree of contact between the outer peripheral surface of the cable 20 and the inner peripheral surface of the housing portion 41 can be increased. Accordingly, heat generated by the cables 20 can be efficiently conducted to the protective tube 40, and heat dissipation in the wire harness 10 can be further improved.

(5) In addition, since the case 50 and the cover 60 are formed as separate bodies, the operation of routing the cables 20 between the pressing portions 64 and the bottom wall 52 of the case 50 so that the cables 20 are pressed by the pressing portions 64 is facilitated. Furthermore, since the pressing portions 64 are formed on the opposing wall 61 of the cover 60, the cables 20 are pressed toward the bottom wall 52 of the case 50 by the pressing portions 64 when the cover 60 is attached to the case 50 in a state in which the cables 20 are housed in the groove portions 51. Thus, the operation of attaching the cover 60 to the case 50 and the operation of pressing the cables 20 using the pressing portions 64 can be performed simultaneously.

(6) The radiation film 70 is formed so as to cover the entire inner peripheral surface of each groove portion 51. According to this configuration, the radiation film 70 can be formed through a coating process or a plating process with more ease compared to a case in which the radiation film 70 is formed on portions of the inner peripheral surface of each groove portion 51.

(7) On the outer peripheral surface of the insulating cover 22 of each cable 20, the radiation film 71 having a higher emissivity than the outer peripheral surface of the insulating cover 22 is formed. According to this configuration, even if the emissivity of the outer peripheral surface of the insulating cover 22 is low, the outer peripheral surface of the insulating cover 22 is covered by the radiation film 71 having a high emissivity. Thus, thermal conduction through radiation can be increased compared to a case in which the radiation film 71 is not formed. Accordingly, even if the inner peripheral surface of a housing portion 41 and the outer peripheral surface of a cable 20 are physically separated from one another, heat can be efficiently transmitted by radiation from the outer peripheral surface of the cable 20 to the housing portion 41, or that is, to the protective tube 40, and heat dissipation in the wire harness 10 can be improved.

Other Embodiments

The above-described embodiments can be modified and implemented as follows. The above-described embodiments and the following modifications can be implemented in combination with one another as long as there is no technical contradiction.

In the above-described embodiments, the radiation film 70 is formed so as to cover the entire inner peripheral surface of each groove portion 51. However, the formation area of the radiation film 70 is not particularly limited. That is, as long as the radiation film 70 is formed so as to cover the entire surface of each projection 55, the formation area of the radiation film 70 is not particularly limited.

Figure 4:
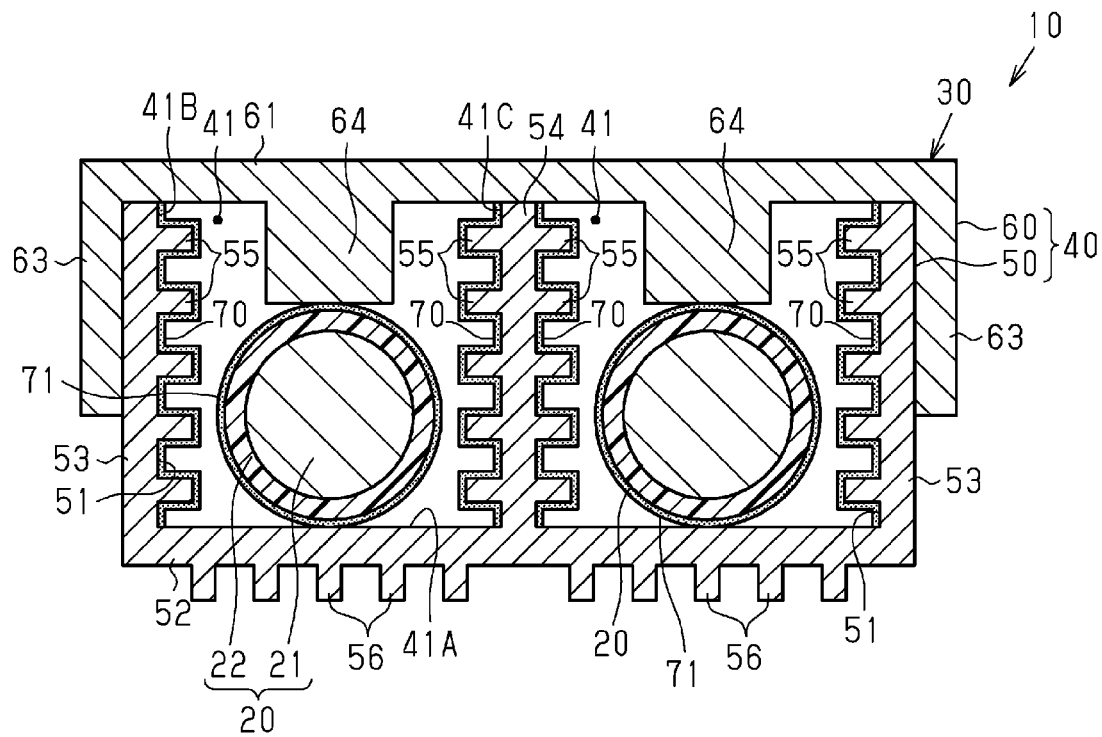
FIG. 4 is a schematic cross-sectional diagram illustrating a wire harness according to a modification.

For example, as illustrated in FIG. 4, the radiation film 70 may be formed on portions of the inner peripheral surface of each groove portion 51. For example, the radiation film 70 may be formed only on portions of the inner peripheral surface of each groove portion 51, where the projections 55 are formed, i.e., only on the inner side surfaces 41B and 41C in this case. The radiation film 70 in this case is formed so as to cover the entire inner side surface 41B and the entire inner side surface 41C of the housing portions 41, and the entire surface of each projection 55, for example. In other words, in the protective tube 40 according to the present modification, the radiation film 70 is not formed on the bottom surface 41A of the inner peripheral surface of each housing portion 41.

Figure 5:
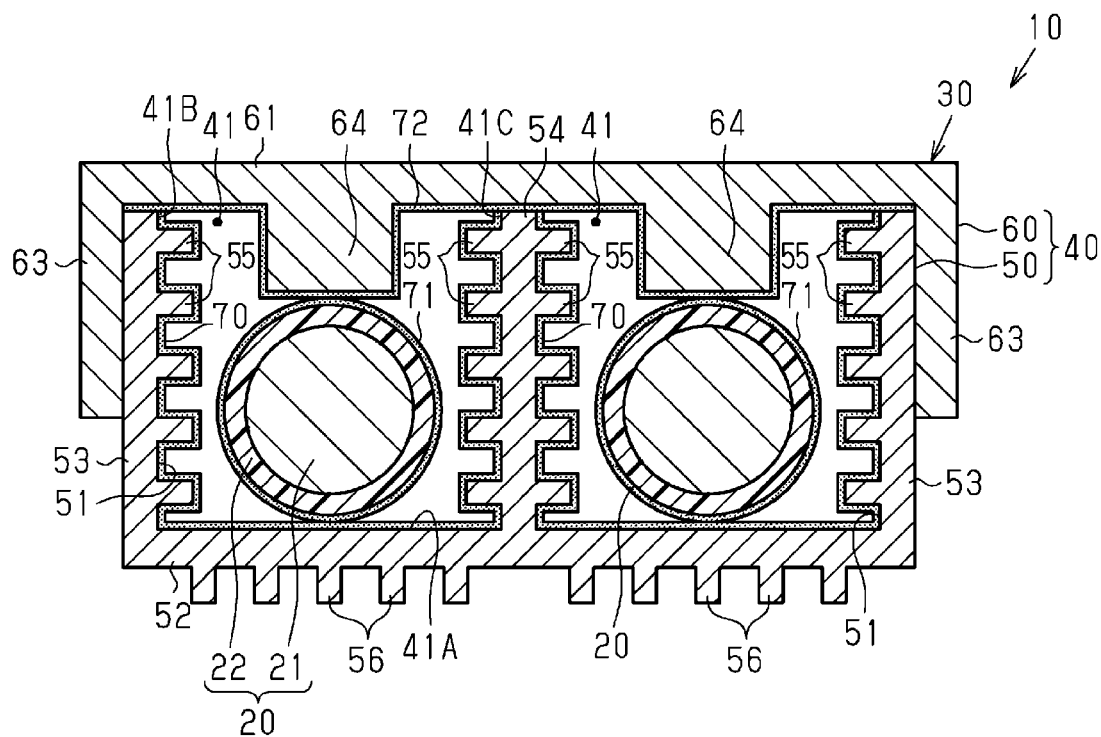
FIG. 5 is a schematic cross-sectional diagram illustrating a wire harness according to a modification.

As illustrated in FIG. 5, a radiation film 72 similar to the radiation film 70 may be formed on the lower surface of the opposing wall 61 constituting the inner peripheral surface of each housing portion 41. For example, the radiation film 72 is formed so as to cover the entire lower surface of the opposing wall 61. For example, the radiation film 72 is formed so as to cover the entire surface of each pressing portion 64. The emissivity of the radiation film 72 is set higher than the emissivity of the lower surface of the opposing wall 61 and the surface of each pressing portion 64. For example, the radiation film 72 is formed in a black color or a color approximating black that has a higher emissivity than the lower surface of the opposing wall 61 and the surface of each pressing portion 64. For example, the emissivity of the radiation film 72 can be set to 0.7 or higher.

Figure 6:
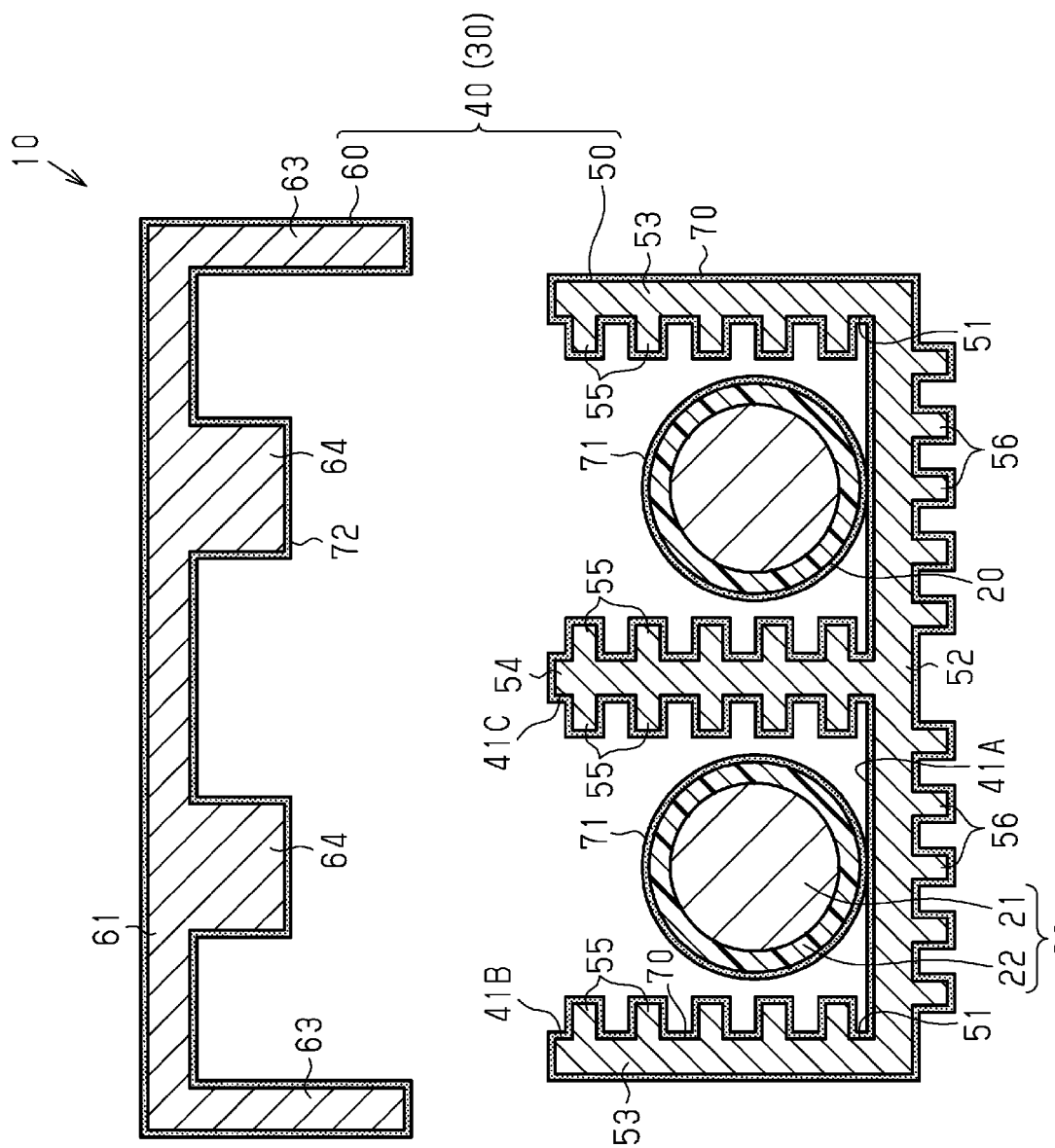
FIG. 6 is a schematic cross-sectional diagram illustrating a wire harness according to a modification.

As illustrated in FIG. 6, the radiation film 70 may also be formed on the outer peripheral surface of the case 50. The radiation film 70 according to the present modification is formed so as to cover the entire outer peripheral surface of the case 50. The radiation film 70 according to the present modification is formed so as to cover the entire inner peripheral surface of each groove portion 51, the entire surface of each projection 55, the entire upper surface of the partition wall 54, the entire upper surface and the entire outer side surface of each side wall 53, the entire lower surface of the bottom wall 52, and the entire surface of each projection 56. That is, the radiation film 70 according to the present modification is formed so as to cover the entire surface of the case 50.

As illustrated in FIG. 6, the radiation film 72 may also be formed on the outer peripheral surface of the cover 60. The radiation film 72 according to the present modification is formed so as to cover the entire outer peripheral surface of the cover 60. The radiation film 72 according to the present modification is formed so as to cover the entire lower surface of the opposing wall 61, the entire surface of each pressing portion 64, the entire upper surface of the opposing wall 61, the entire outer side surface of each side wall 63, the entire lower surface of each side wall 63, and the entire inner side surface of each side wall 63. That is, the radiation film 72 according to the present modification is formed so as to cover the entire surface of the cover 60.

In the above-described embodiment, the pressing portions 64 are formed so as to extend over the entire length of the cover 60 in the lengthwise direction L. However, there is no limitation to this. The pressing portions 64 may be formed on portions of the cover 60 in the lengthwise direction L. For example, the pressing portions 64 may be formed by cutting and raising portions of the opposing wall 61 toward the bottom wall 52 of the case 50 through pressing or the like.

In the above-described embodiment, the pressing portions 64 are formed on the opposing wall 61 of the cover 60. However, there is no limitation to this. For example, the pressing portions 64 may be formed on the bottom wall 52 of the case 50. Alternatively, the pressing portions 64 may be formed on both the opposing wall 61 of the cover 60 and the bottom wall 52 of the case 50.

In the above-described embodiment, a cushioning material made of an elastic material such as an elastomer or rubber may be disposed between the cables 20 and the pressing portions 64. According to such a configuration, the outer peripheral surface of each cable 20 can be prevented from being damaged by a pressing portion 64.

Figure 7:
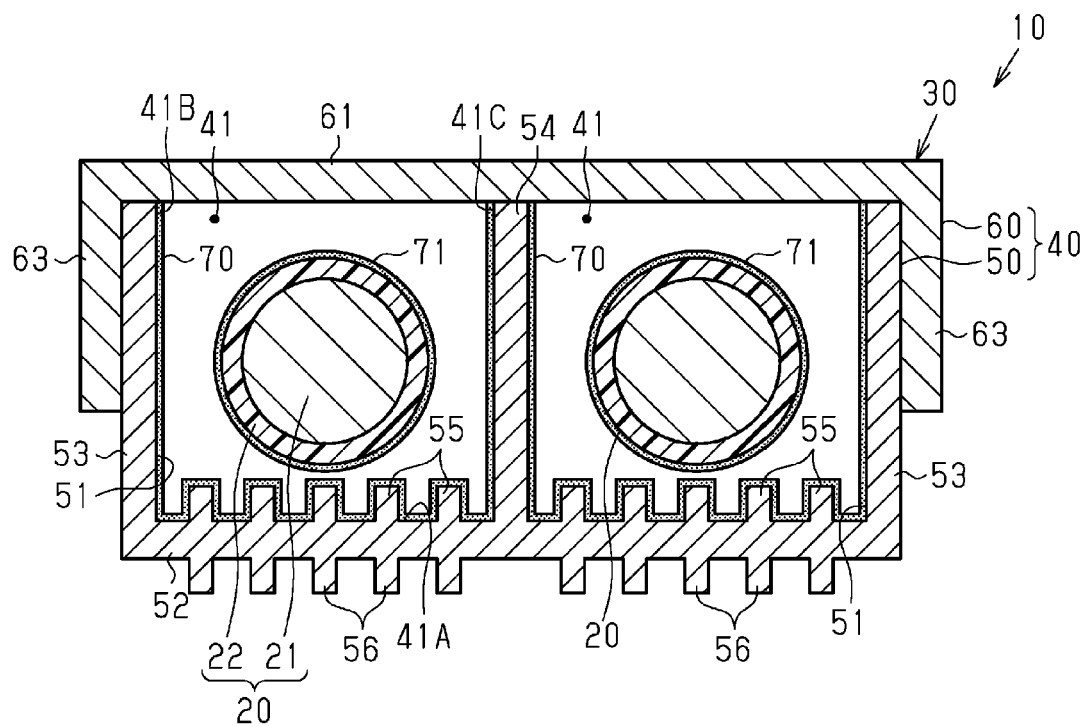
FIG. 7 is a schematic cross-sectional diagram illustrating a wire harness according to a modification.

As illustrated in FIG. 7, the formation of the pressing portions 64 may be omitted.

In the above-described embodiment, the projections 55 are formed on the inner side surfaces 41B and 41C of the inner peripheral surface of each groove portion 51. However, there is no limitation to this. For example, the projections 55 may be formed only on the inner side surface 41B of the inner peripheral surface of each groove portion 51. Alternatively, the projections 55 may be formed only on the inner side surface 41C of the inner peripheral surface of each groove portion 51.

For example, as illustrated in FIG. 7, the projections 55 may be formed only on the bottom surface 41A of the inner peripheral surface of each groove portion 51. In this case, the radiation film 70 is formed so as to cover the surface of each projection 55 formed on the bottom surface 41A.

Figure 8:
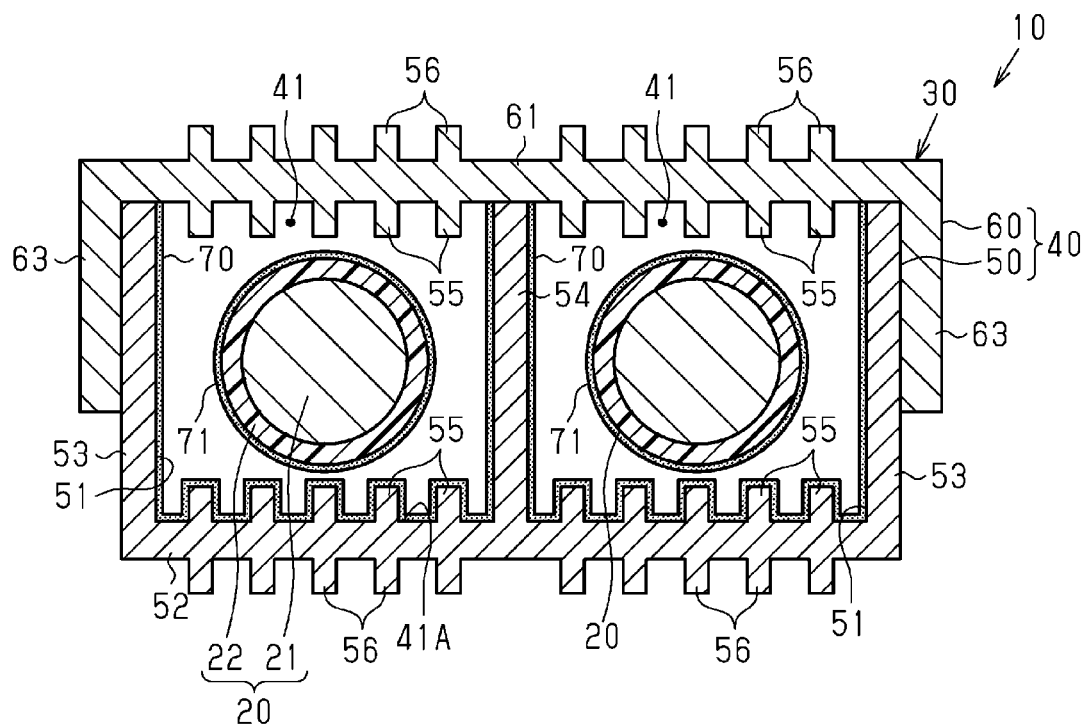
FIG. 8 is a schematic cross-sectional diagram illustrating a wire harness according to a modification.

As illustrated in FIG. 8, the projections 55 may be formed on the lower surface of the opposing wall 61 constituting the inner peripheral surface of each housing portion 41. In the present modification, the projections 55 are formed on the lower surface of the opposing wall 61 and the bottom surface 41A of the housing portion 41 of the inner peripheral surface of each housing portions 41. Note that, in the present modification, the projections 55 formed on the bottom surface 41A of each housing portion 41 may be omitted. That is, the projections 55 may be formed only on the lower surface of the opposing wall 61 of the inner peripheral surface of each housing portion 41.

In the above-described embodiment, the projections 55 are formed so as to extend over the entire length of the protective tube 40 in the lengthwise direction L. However, there is no limitation to this. The projections 55 may be formed in portions of the protective tube 40 in the lengthwise direction L.

The number of projections 55 is not particularly limited.

In the above-described embodiment, the projections 56 are formed only on the lower surface of the bottom wall 52 of the case 50 of the outer peripheral surface of the protective tube 40. However, the formation location of the projections 56 is not particularly limited.

For example, as illustrated in FIG. 8, the projections 56 may be formed on the upper surface of the opposing wall 61. In the present modification, the projections 56 formed on the lower surface of the bottom wall 52 may be omitted. Alternatively, the projections 56 may be formed over the entire outer peripheral surface of the protective tube 40. However, it is preferable not to form the projections 56 on portions of the outer side surfaces of the side walls 53 of the case 50 that are covered by the side walls 63 of the cover 60.

In the above-described embodiment, the projections 56 are formed so as to extend over the entire length of the protective tube 40 in the lengthwise direction L. However, there is no limitation to this. The projections 56 may be formed on portions of the protective tube 40 in the lengthwise direction L.

The number of projections 56 is not particularly limited.

Figure 9:
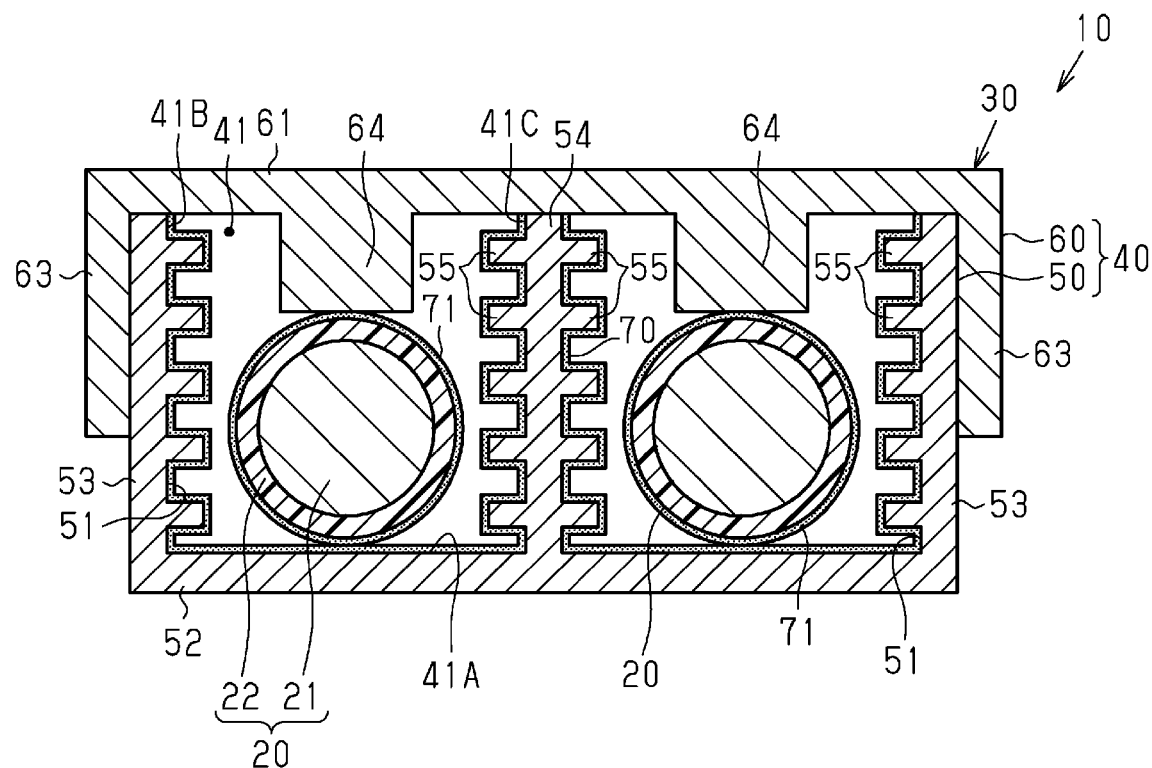
FIG. 9 is a schematic cross-sectional diagram illustrating a wire harness according to a modification.

As illustrated in FIG. 9, the projections 56 formed on the outer peripheral surface of the protective tube 40 may be omitted. The lower surface of the bottom wall 52 in this case is formed to be a flat surface, for example.

In the above-described embodiment, the present disclosure is realized as a protective tube 40 having a plurality of housing portions 41 in each of which one of the plurality of cables 20 is individually housed. However, there is no limitation to this.

Figure 10:
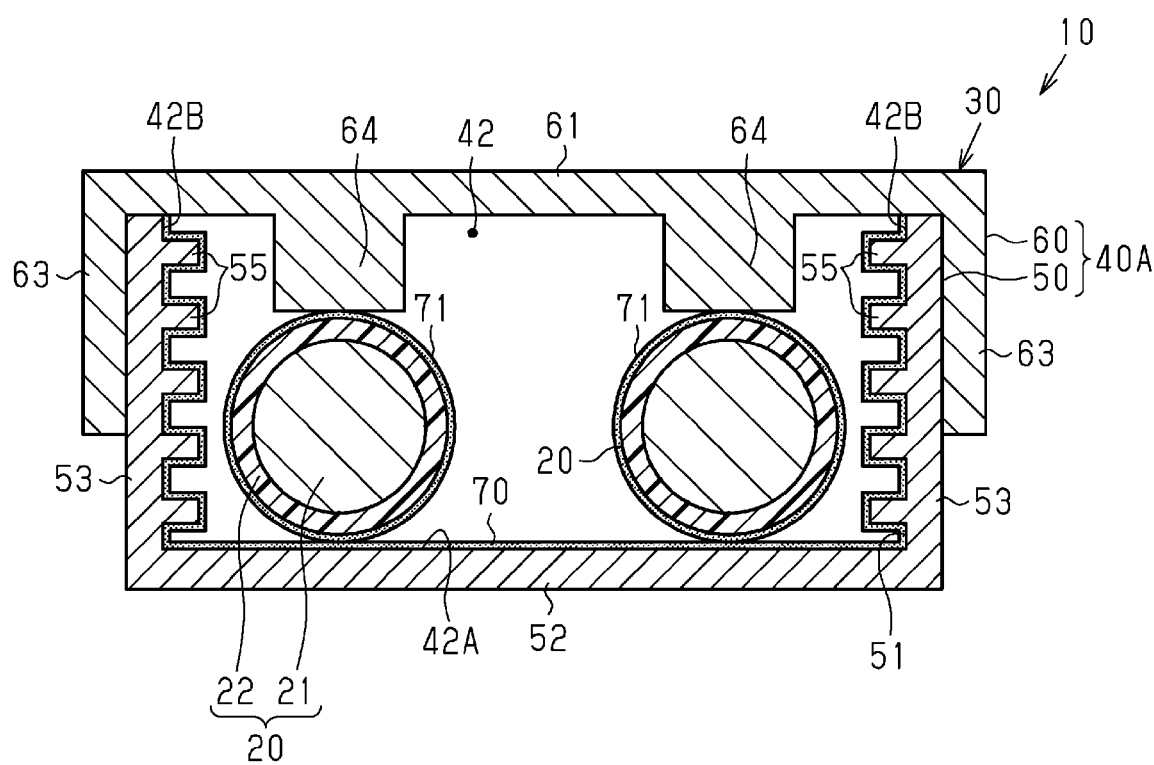
FIG. 10 is a schematic cross-sectional diagram illustrating a wire harness according to a modification.

For example, as illustrated in FIG. 10, the present disclosure may be realized as a protective tube 40A having a housing portion 42 in which the plurality of cables 20 are collectively housed. In the protective tube 40A according to the present modification, the partition wall 54 is omitted from the case 50 of the protective tube 40 illustrated in FIG. 2. In the protective tube 40A, the bottom wall 52 of the case 50 constitutes a bottom surface 42A of the housing portion 42, and the side walls 53 of the case 50 constitute inner side surfaces 42B of the housing portion 42.

In the above-described embodiment, the case 50 and the cover 60 are formed as separate parts, and the protective tube 40 is formed by attaching the cover 60 to the case 50. However, there is no limitation to this.

Figure 11:
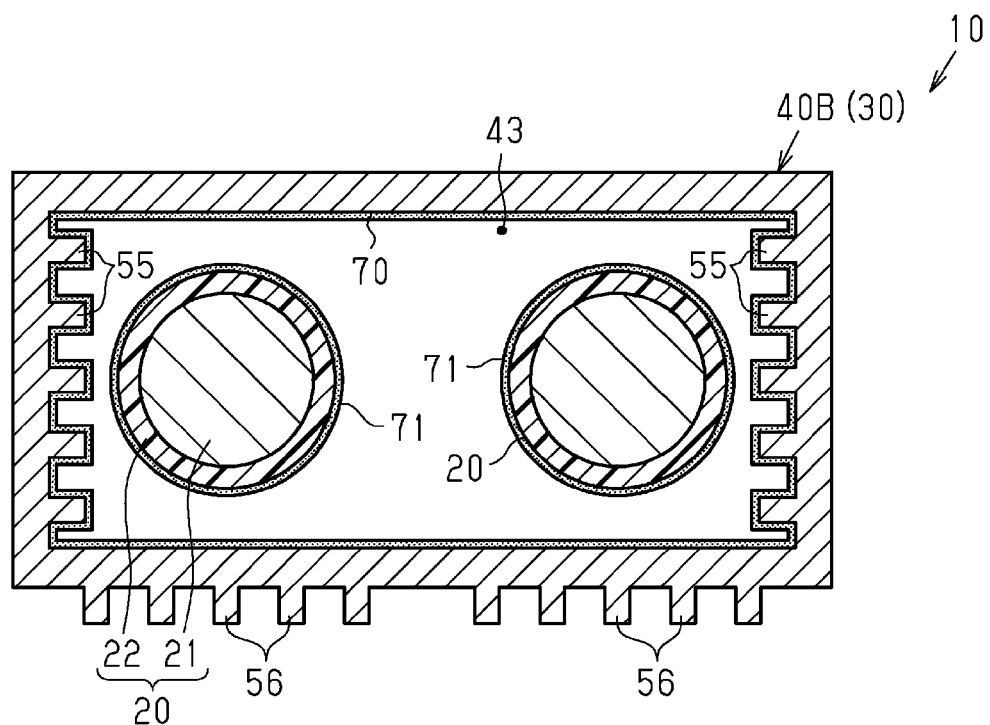
FIG. 11 is a schematic cross-sectional diagram illustrating a wire harness according to a modification.

For example, as is the case with a protective tube 40B illustrated in FIG. 11, the case 50 and the cover 60 may be formed integrally. For example, the protective tube 40B is formed in the shape of a tube having a housing portion 43 in which the plurality of cables 20 are housed. The protective tube 40B according to the present modification is formed in the shape of a polygonal tube having a housing portion 43 in which the plurality of cables 20 are collectively housed. In the protective tube 40B, the inner peripheral surface of the housing portion 43 is integrally formed continuously over the entire periphery in the peripheral direction. That is, in the protective tube 40B, the inner peripheral surface of the housing portion 43 is formed continuously over the entire periphery in the peripheral direction without any joints. Here, the projections 55 may be formed on portions of the inner peripheral surface of the housing portion 43 or over the entire inner peripheral surface of the housing portion 43. Note that, in the example illustrated in FIG. 11, the projections 55 are formed only on portions of the inner peripheral surface of the housing portion 43. Furthermore, the radiation film 70 may be formed over the entire inner peripheral surface of the housing portion 43 or only on portions of the inner peripheral surface of the housing portion 43. Note that, in the example illustrated in FIG. 11, the radiation film 70 is formed so as to cover the entire inner peripheral surface of the housing portion 43.

In the above-described embodiment, the housing portions 41 are formed in the shape of a rectangular tube. However, there is no limitation to this. The housing portions 41 may be formed in the shape of a cylinder, an elliptical cylinder, or an oval cylinder, for example.

Figure 12:
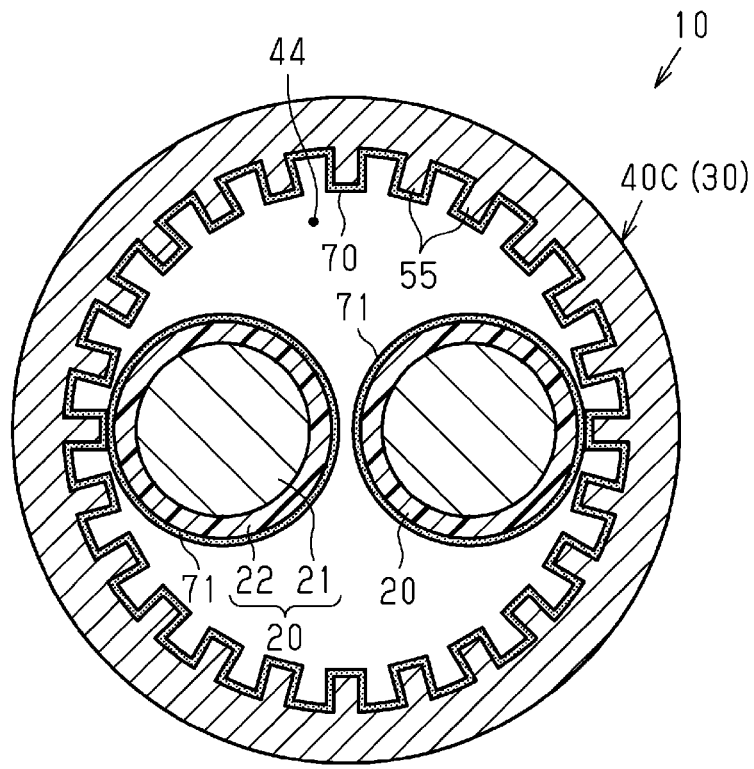
FIG. 12 is a schematic cross-sectional diagram illustrating a wire harness according to a modification.

For example, as illustrated in FIG. 12, a protective tube 40C may be formed in the shape of a cylinder. The protective tube 40C according to the present modification is formed in the shape of a cylinder having a housing portion 44 in which the plurality of cables 20 are collectively housed. In the protective tube 40C, the inner peripheral surface of the housing portion 44 is integrally formed continuously over the entire periphery in the peripheral direction. That is, in the protective tube 40C, the inner peripheral surface of the housing portion 44 is formed continuously over the entire periphery in the peripheral direction without any joints. Here, the projections 55 may be formed on portions of the inner peripheral surface of the housing portion 44 or over the entire inner peripheral surface of the housing portion 44. Note that, in the example illustrated in FIG. 12, the projections 55 are formed over the entire inner peripheral surface of the housing portion 44. Furthermore, the radiation film 70 may be formed over the entire inner peripheral surface of the housing portion 44 or only on portions of the inner peripheral surface of the housing portion 44. Note that, in the example illustrated in FIG. 12, the radiation film 70 is formed so as to cover the entire inner peripheral surface of the housing portion 44.

In the above-described embodiment, the case 50 and the cover 60 are made of a metal material. However, there is no limitation to this. For example, an electroconductive resin material or a non-electroconductive resin material can be used as the material of the case 50 and the cover 60. For example, synthetic resins such as polyolefin, polyamide, polyester, and ABS resins can be used as a resin material.

In the above-described embodiment, the radiation film 71 formed on the outer periphery of each cable 20 may be omitted. Alternatively, the insulating cover 22 of each cable 20 may be omitted, and the radiation film 71 may be formed on the outer periphery of the core wire 21. In this case, the emissivity of the radiation film 71 is set higher than the emissivity of the core wire 21.

In the above-described embodiment, each cable 20 is realized as an unshielded cable, but each cable 20 may be realized as a shielded cable that has an electromagnetic shield structure.

In the above-described embodiment, the number of cables 20 passed through the inside of the exterior member 30 is two. However, the number of cables 20 is not particularly limited and can be changed depending on vehicle specifications. For example, the number of cables passed through the inside of the exterior member 30 may be one or three or more. For example, a configuration may be adopted in which a low-voltage cable that connects a low-voltage battery and various types of low-voltage devices (such as one or more lamps or car audio, for example) is added as a cable passed through the exterior member 30. Alternatively, a configuration may be adopted in which only one or more low-voltage cables are passed through the exterior member 30.

The positional relationship between the inverter 11 and the high-voltage battery 12 in the vehicle V is not limited to that in the above-described embodiment, and may be changed, as appropriate, in accordance with vehicle configuration.

In the above-described embodiment, the inverter 11 and the high-voltage battery 12 are employed as electric devices that are connected by the wire harness 10. However, there is no limitation to this. For example, the present disclosure may be employed for one or more cables connecting the inverter 11 and the motor for driving vehicle wheels. That is, the present disclosure is applicable to any cable electrically connecting electric devices installed in a vehicle.

The installation position of the wire harness 10 is not limited to the position in the above-described embodiment, and can be changed as appropriate.

The radiation films 70, 71, and 72 are sometimes called radiation-improving films that are configured so as to adhere to the underlying material (for example, a metal base material) in the exterior member 40 and increase the emissivity of the exterior member 40 with respect to at least infrared radiation of a predetermined wavelength (for example, near infrared radiation or far infrared radiation).

In some implementations of the present disclosure, radiation film emissivity may be set to 0.7-1.0.

In some implementations of the present disclosure, the exterior member 40 including the first projections 55 can be formed using a first material, and the radiation film can be formed using a second material that is different from the first material.

In some implementations of the present disclosure, the exterior member 40 including the first projections 55 can be formed using a first metal base material (for example, aluminum, copper, iron, or alloys thereof) that contains a first metal element (for example, aluminum, copper, or iron) as the main component, and the radiation film may be a coating film or a plating film that contains a second metal element (for example, nickel, chromium, or the like) that is different from the first metal element.

In some implementations of the present disclosure, the exterior member 40 and/or the first projections 55 can have a surface having a first emissivity, and the radiation film can have an inner surface that adheres to the surface of the exterior member 40 and/or the first projections 55 and that forms an interface between the inner surface and the surface, and an exposed outer surface that has a second emissivity that is higher than the first emissivity.

In some implementations of the present disclosure, the exterior member 40 including the first projections 55 can be made of a metal base material (for example, aluminum, copper, iron, or alloys thereof), and the radiation film may be a non-metal and may be a heat-resistant material, for example.

In some implementations of the present disclosure, the radiation film may contain a dye or a colorant.

The invention claimed is:

1. An exterior member comprising:
   a housing in which a cable is to be housed;
   a first projection that is formed on an inner peripheral surface of the housing and that is formed so as to protrude toward an inside of the housing from the inner peripheral surface of the housing; and
   a first radiation film that covers a surface of the first projection and that has a higher emissivity than the surface of the first projection.

2. The exterior member according to claim 1 further comprising
   a second projection that is formed on an outer peripheral surface of the housing and that is formed so as to protrude toward an outside from the outer peripheral surface of the housing,
   wherein the second projection is formed only on a portion of the outer peripheral surface of the housing that is located on an opposite side from a heat source with the housing therebetween.

3. The exterior member according to claim 1, wherein:
   the exterior member further includes:
      a case that has a groove in which the cable is to be housed; and
      a cover that is attached to the case and that covers the groove,
   the housing is formed by the groove and the cover, and the first projection is formed only on an inner side surface in the inner peripheral surface of the housing, the inner side surface being disposed between a bottom wall of the case and an opposing wall of the cover that opposes the bottom wall.

4. The exterior member according to claim 3,
   wherein one of the bottom wall of the case and the opposing wall of the cover is provided with a pressing portion that presses the cable toward the other one of the bottom wall of the case and the opposing wall of the cover.

5. The exterior member according to claim 3,
   wherein the first radiation film is formed so as to cover an entire inner peripheral surface of the groove.

6. The exterior member according to claim 3,
   wherein the first radiation film is formed so as to cover only the inner side surface of the inner peripheral surface of the housing.

7. A wire harness comprising:
   the cable; and
   the exterior member according to claim 1.

8. The wire harness according to claim 7, wherein:
   the cable includes a core wire and an insulating cover that covers an outer periphery of the core wire, and
   a second radiation film having a higher emissivity than an outer peripheral surface of the insulating cover is formed on the outer peripheral surface of the insulating cover.

9. The exterior member according to claim 1, wherein the emissivity of the first radiation film is 0.7 or higher.

* * * * *